May 10, 1955  S. G. ZUCKERMAN  2,707,834
DIRECT READING MICROMETER
Filed July 25, 1952  3 Sheets-Sheet 1
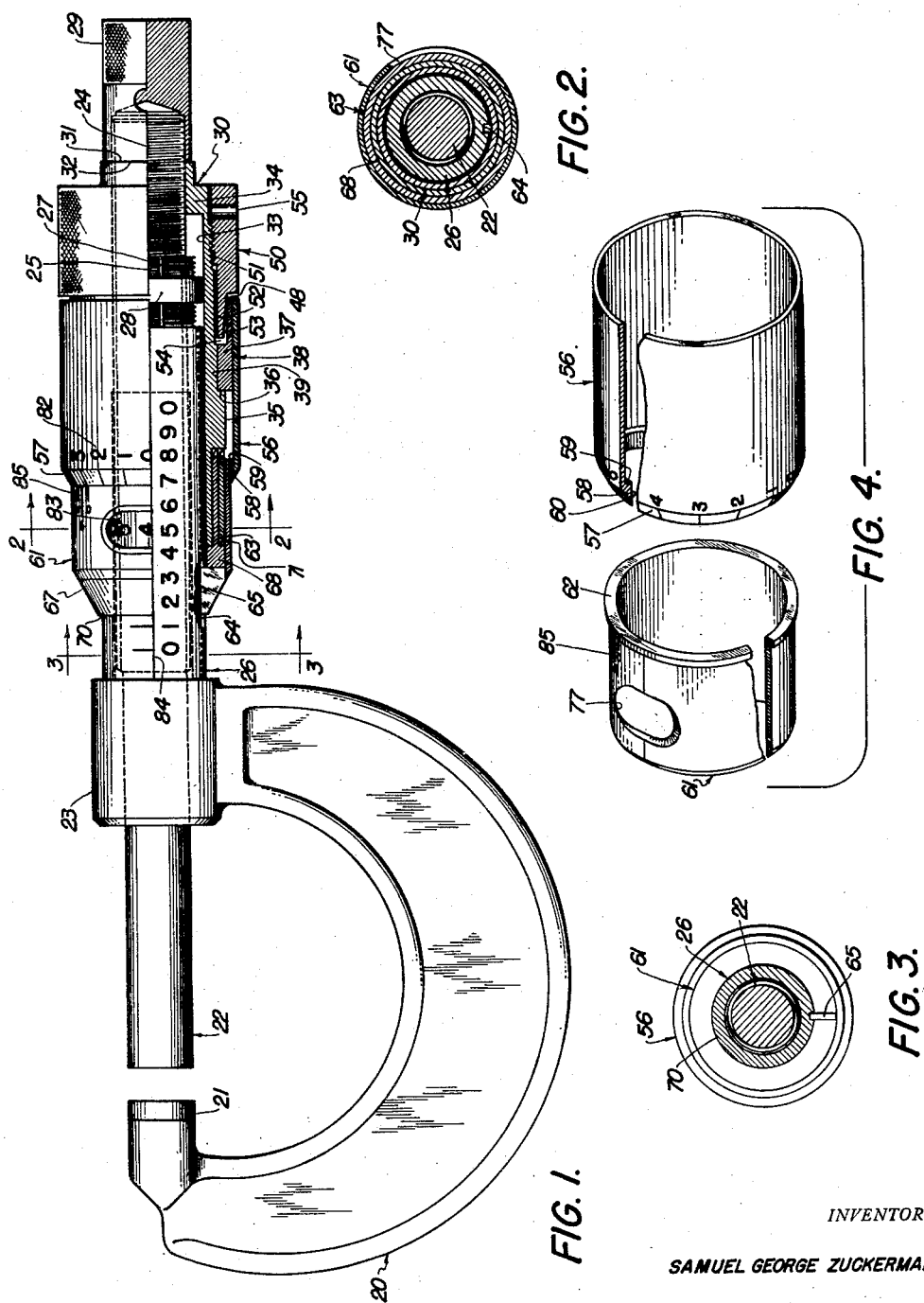
INVENTOR.
SAMUEL GEORGE ZUCKERMAN.
ATTORNEY May 10, 1955
S. G. ZUCKERMAN
2,707,834
DIRECT READING MICROMETER
Filed July 25, 1952
3 Sheets-Sheet 2
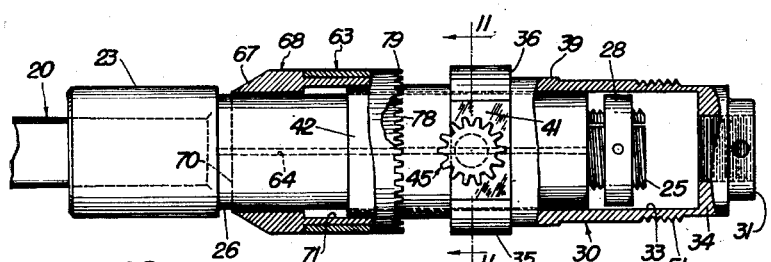
FIG. 10.
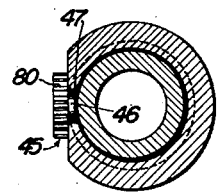
FIG. 11.
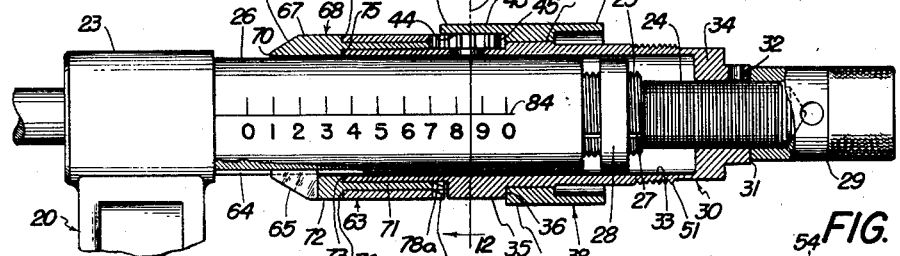
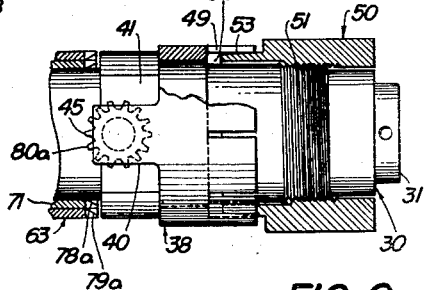
FIG. 8.
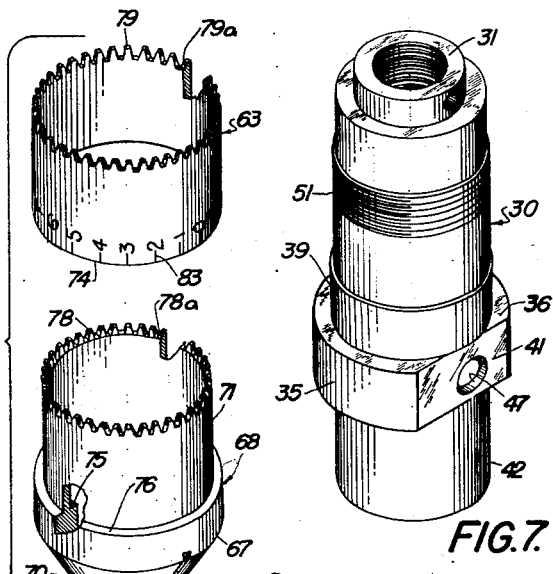
FIG. 9.
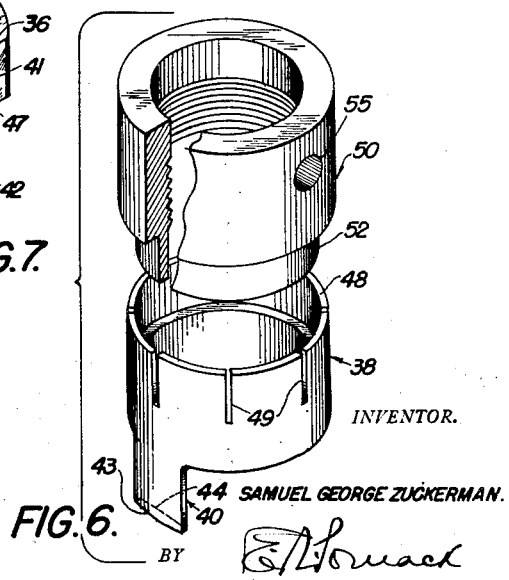
FIG. 7.
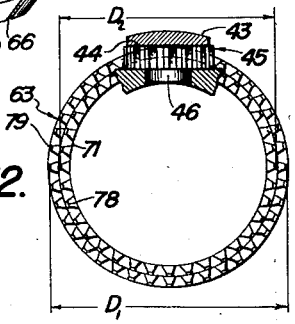
FIG. 5.
FIG. 12.
FIG. 6.
INVENTOR.
SAMUEL GEORGE ZUCKERMAN.
BY
ATTORNEY May 10, 1955  S. G. ZUCKERMAN  2,707,834
DIRECT READING MICROMETER
Filed July 25, 1952  3 Sheets-Sheet 3

INVENTOR.
SAMUEL GEORGE ZUCKERMAN.
BY
ATTORNEY

United States Patent Office 2,707,834
Patented May 10, 1955

2,707,834

DIRECT READING MICROMETER

Samuel George Zuckerman, Brooklyn, N. Y., assignor of one-half to Harold Glatzer, New York, as trustee, and one-eighth to Marion Forman, Brooklyn, N. Y.

Application July 25, 1952, Serial No. 300,881

21 Claims. (Cl. 33—166)

This invention relates to micrometers, particularly to those of the direct reading type, in the category of the micrometer described in my prior application, Serial No. 133,226, which matured into Patent No. 2,613,445.

In the conventional screw type of micrometer, the customary pitch is .025", the scale on the barrel containing graduations of .025", and the bevelled edge of the rotatable thimble being graduated into 25 parts, so that each graduation represents .001". Three steps are accordingly required to read a measurement, to wit, taking note of the highest figure visible on the barrel, adding .025" for each graduation visible between that figure and the thimble edge, and adding to this sum the number of the graduation on the thimble which coincides with or is nearest to the longitudinal reference line on the barrel. It is within the contemplation of my invention to eliminate these three steps by enabling the reading to be taken directly, without interpolations or computations.

Various attempts have heretofore been made to accomplish this general objective, but the resulting devices have been found to be unsatisfactory. This was due to the fact that the direct-reading indicating means were generally associated with dials, pointers, gearing mechanisms and other moving elements which not only were difficult to fabricate, but also were not comparable in accuracy to the conventional screw type of micrometer, inasmuch as the multiplicity of movable elements employed in such devices produced cumulative sequences of lost motion from backlash, inaccurate interfittings and progressive wear. It is accordingly an important object of my invention to obviate the use of elements which might result in such inaccuracies; and in this aspect of my invention it is an object to provide a screw micrometer construction with means to enable it to be directly read, whereby it will meet the highest standards of accuracy.

It is also an object of my invention to provide a stationary vernier which will at all times remain in close juxtaposition to its coactive rotary scale actuated by the rotation of the spindle.

It is further within my contemplation to provide a device adapted for wide range readings, having the aforesaid features and advantages, and operable precisely in the manner of a conventional screw micrometer. And in this aspect of my invention, it is a further object to enable this device to be manufactured by employing the major portion of the fabricating machinery used in producing conventional screw micrometers.

Other objects, features and advantages will appear from the drawings and the description hereinafter given.

Referring to the drawings,

Figure 1 is a side view of a micrometer constituting a form of my invention, part of the device being shown in longitudinal section, with parts broken away for clarity.

Figure 2 is a section of Figure 1 taken along line 2—2.

Figure 3 is a section of Figure 1 taken along line 3—3.

Figure 4 is an exploded perspective view of the coacting outer and intermediate scale-bearing cylinders, parts being broken away for clarity.

Figure 5 is an exploded perspective view of the coacting inner scale bearing cylinder and indicating cylinder, parts being broken away for clarity.

Figure 6 is an exploded perspective view of the coacting locking ring and lock nut, parts being broken away for clarity.

Figure 7 is a perspective view of the thimble of the illustrated device.

Figure 8 is a fragmentary side view of the device of Figure 1, the intermediate and outer cylinders and locking nut being removed, the movable sub-assembly on the barrel being shown in section.

Figure 9 is a fragmentary plan view of Figure 8, showing the locking nut, but spindle removed, portions being shown in section.

Figure 10 is a fragmentary part plan and part sectional view of Figure 8, with the locking ring, locking nut, spindle and rear cap removed, the spur gear being shown detached from the crown gears, parts being removed for clarity.

Figure 11 is a section of Figure 10 taken substantially along line 11—11.

Figure 12 is a section of Figure 8, taken along line 12—12.

Figure 13:
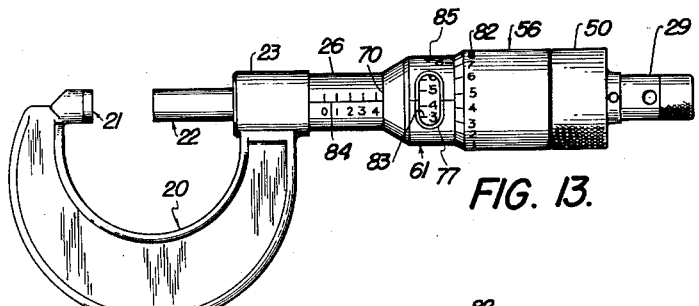
Figure 13 is a complete side view of the micrometer illustrated in the above figures.

In the form of my invention illustrated, a micrometer caliper is shown having a frame 20 of generally conventional shape, the anvil 21 of which is adapted for abutting engagement with the forward end of the spindle 22 slidably supported by the bearing portion 23 (see Figure 1). The rear of the spindle has the threaded portion 24 which extends through and is in operative threaded engagement with the internally and externally threaded tube 25, the latter extending into and being supported by the hollow barrel 26 which is fixed relative to said frame 20. The said tube 25 has one or more longitudinal slots 27, and its outer surface is preferably of slightly tapered configuration commonly employed in such structures, so that upon an operative turning of the adjusting nut 28, the tightness of the threaded fit between spindle portion 24 and internally threaded wall of tube 27 can be regulated, in known manner. The structure thus far described is substantially in accordance with the basic construction of conventional screw micrometers, a rotation of the spindle 22 causing it to move to or from the anvil 21, the amount of such longitudinal movement depending upon the pitch of the threads on portion 24 of the spindle.

While in conventional English system micrometers the pitch is such that there are 40 threads per inch (so that for each spindle revolution there is a longitudinal movement of .025") I prefer to employ a pitch to produce longitudinal movement per revolution (measurable in thousandths of an inch) that is a multiple of 10. Thus the threaded portion of this spindle may contain either 33⅓ or 50 threads per inch, to produce longitudinal movements, per revolution, of either .030" or .020", respectively. In the embodiment of my invention illustrated and described herein, the threaded portion 24 of this spindle has 50 threads per inch, whereby the pitch is .020". As will hereinafter appear, the parts are calibrated for this pitch.

Secured to said rear threaded portion 24 of spindle 22 are the screw cap 29 and the thimble 30, the rear surface 31 of the thimble and the front surface 32 of the cap being in abutment, the spindle, cap 29 and thimble 30 being in fixed relation and movable together.

The said thimble 30 is a hollow generally cylindrical member, and having an internal cylindrical wall 33 proportioned for a slidable and rotatable fit over the outer surface of the said barrel 26. As illustrated, the said internal wall 33 extends from the rear transverse wall 34 forwardly to the front terminal of the thimble, the barrel 26 extending into the thimble and being in slidable and rotatable engagement therewith. The thimble contains, intermediate its ends, an annular ridge or wall 35 providing an annular abutment surface 36 against which is positioned the relatively heavy body portion 37 of the locking ring 38. Said body portion 37 forms a tight friction fit with the said thimble at contact surface 39, so that the locking ring 38 moves with the thimble 30 and spindle 22.

The forward portion of the locking ring 38 has a lip 40 extending over and spaced from a flat portion 41 of said annular wall 35. This flat portion is flush with the outer surface of this forward cylindrical portion 42 of the thimble. The said lip 40, while having an arcuate outer surface 43, has a flat inner surface 44 parallel to said flat portion 41 of the thimble. The distance between surfaces 41 and 44 is such as to operatively accommodate therebetween a spur gear 45, the latter having a shaft 46 which extends into and is rotatable within the aperture 47 extending inwardly from flat surface 41 of the thimble.

The rear portion 48 of the locking ring 38 is a relatively thin annular wall with longitudinal slots 49 therein, whereby it has slight flexibility, said annular wall being thinner than heavy portion 39, and being accordingly spaced from the adjacent annular wall of the thimble. A lock nut 50 is mounted over the rear portion of thimble 30, and is in threaded engagement with the outer threads 51 of the thimble. Said lock nut has an annular forwardly extending lip 52 with an outer tapered surface 53. The said annular lip is disposed in the space 54 between the thimble, and said rear slotted wall 48 of the locking ring, the said tapered surface 53 engaging the inner surface of said slotted wall. The arrangement is hence such that upon a rotation of the lock nut (by inserting a wrench in aperture 55) and a consequent operative forward movement thereof, the lip 53 will force this said slotted wall 48 outwardly to cause this locking ring 38 to frictionally engage the outer scale cylinder 56, which will now be described.

This outer scale cylinder 56 (see Figures 1 and 4) is proportioned to rotatably fit over this locking ring 38 when the slotted wall 48 thereof is in its unexpanded condition; but when it is expanded by the action of lip 52 of lock nut 50, it becomes locked to said lock nut, whereby the outer cylinder 56 is movable with the said locking ring, the locking nut 50, the spindle 22, the thimble 30 and the rear cap 29.

The forward portion of said scale cylinder 56 has an annular beveled wall 57 and an inwardly extending annular ridge 58. Said ridge has an annular transverse abutment wall 59 and an inner annular wall 60. The latter wall is rotatably disposed over the outer surface of an intermediate scale cylinder 61 the rear of which is provided with a flange 62 in engagement with the said abutment wall 59. As will appear from the description hereinafter given, the said intermediate scale cylinder 61 is non-rotatable, but is nevertheless movable longitudinally with the operative longitudinal movement of the spindle 22 and associated parts, said cylinder 61 having a window 77 through which is visible the markings on the inner scale cylinder 63, the latter being rotatable at a rate which is a predetermined fraction of that of the said outer scale cylinder 56.

The said barrel 26 contains along the underside thereof the longitudinal keyway 64 within which is slidably movable the key 65. This key is friction-fitted into the slot 66 of the front head portion 67 of the indicator member 68, the forward portion of the key 65 being bevelled to conform to the bevelled indicator surface 69 which terminates in the reference or scale indicating edge 70. The said head portion 67 carries the rearwardly extending non-rotatable gear cylinder 71 which embraces the said forward part 42 of the thimble 30, the said part 42 being in rotatable engagement with cylinder 71. Disposed over and in rotatable engagement with said non-rotatable gear cylinder 71 is the said rotatable inner scale cylinder 63. In tight frictional engagement with the outer surface 72 of the said head portion 67 is the said intermediate scale cylinder 61, so that said latter cylinder, though non-rotatable, is movable longitudinally of the barrel together with the longitudinal movement of the indicating member 68, the spindle 22 and associated parts.

It will be noted that in the assembled position of the parts as above described, the foremost edges 73 and 74 of the thimble 30 and inner scale cylinder 63, respectively, are in abutment with the rear surfaces 75 and 76 of the head portion 67. In view of the aforesaid interlocking relation of inner ridge 58 and flange 62 (of the respective outer and intermediate cylinders 56 and 61), the arrangement is hence such that, once assembled, the parts are firmly held in position against displacement, the non-rotatable gear cylinder 71 being at all times maintained in proper relation to the annular wall 42 and the revolvable gear cylinder 63 by which it is flanked.

The rear end of said cylinder 71 has about its periphery a plurality of crown gear teeth 78; and the rear end of said cylinder 63 also has about its periphery a plurality of crown gear teeth 79, the said gear teeth on both cylinders being all substantially of the same size. The two said sets of gear teeth 78 and 79 are in substantially the same vertical plane, that is, in a plane normal to the longitudinal axis of the barrel 26. The spur gear 45 has teeth 80 which are proportioned and arranged to be in simultaneous engagement with adjacent teeth of said sets 78 and 79. In the illustrated arrangement, the thickness of gear teeth 80, measured in the direction of the axis of rotation 81 of said spur gear 45, is substantially equal to the combined thickness of the gear teeth 73 and 79 of cylinders 71 and 63, respectively, measured in the same direction. The arrangement is hence such that spur gear 45 is in mesh with both sets of gear teeth during the operative rotation of the thimble 30 and associated parts, said spur gear being disposed between the said flat surfaces 44 and 41 of this said lip 40 and said thimble, the said spur gear and said lip being encased within the outer scale cylinder 56. It is preferred that the crown gears 78 and 79 be bevelled on the inner surfaces 78a and 79a thereof (see Figure 5) and that the addendum 80a of the spur gear's teeth 80 be shortened (Figure 9), to prevent interference between these gears and facilitate their operation.

It is evident that there are more teeth on cylinder 63 than on cylinder 71, since the teeth are all of the same size and the diameter of cylinder 63 is greater than that of cylinder 71. When the thimble 30 is operatively rotated, it will carry with it the spur gear 45, whereby the latter will revolve about the longitudinal axis of barrel 26. Since spur gear 45 is free to rotate also about its own axis 81, it will do so while it is revolving about the said longitudinal axis of the barrel; and during such rotation it is at all times in engagement with the teeth 78 and 79 on both of said cylinders 71 and 63. Inasmuch as cylinder 71 is held against rotation by key 65, as aforesaid, spur gear 45 rides on the said teeth 78 of cylinder 71, at the same time being in engagement with teeth 79 on rotatable cylinder 63. Obviously, the outermost portion of the spur gear 45—that is, the portion in engagement with outer teeth 79, travels a greater distance than the innermost portion of gear 45—that is, the portion in engagement with inner teeth 78. The difference in travel of the two said portions of the same spur gear thus results in a transmission of motion to the gear 79 on the rotatable cylinder 63. There is accordingly a rotary movement of the cylinder 63 relative to the non-rotatable indicating member 68 and the non-rotatable intermediate cylinder 61. The amount of such rotation, that is, the relation of such rotation to the rotation of thimble 30 and outer cylinder 56, depends on the ratio between the pitch diameters of the two sets of gear teeth 78 and 79, or between the number of teeth on said cylinders 71 and 63.

The motion transmitted to cylinder 63, being a function of the ratio between the circumferences of the two cylinders, may be expressed by the formula $(D_1-D_2)\pi$, where $D_1$ and $D_2$ are the respective corresponding diameters of cylinders 63 and 71. If then, $D_2$ is made equal to nine-tenths of $D_1$, the transmitted motion equals $(D_1-.9D_2)\pi$, which equals $.1D_2\pi$. This means that for every revolution of outer cylinder 56, the inner cylinder 63 makes one-tenth of a revolution. I have used this relationship of parts in the form of my invention illustrated, as will more clearly hereinafter appear.

As aforesaid, the pitch of threads 24 on the specific spindle illustrated is .020″. Hence for every revolution of the spindle, it will move longitudinally twenty thousandths of an inch. Not only will the spindle 22 move this distance, but also the revolvable parts comprising the thimble 30, cap 29, lock nut 50, locking ring 38, outer cylinder 56 and gear cylinder 63, as well as the non-revolvable parts comprising the intermediate cylinder 61, the indicating member 68 and the key 65. In other words, a rotation of outer cylinder 56, for example, will cause a forward or rearward movement of the entire sub-assembly of parts mounted over the barrel 26.

Figure 17:
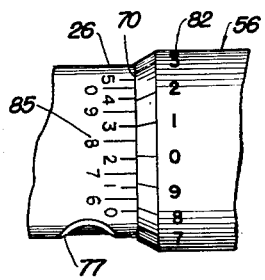
Figure 17 is a top view of Figure 16.
Figure 16:
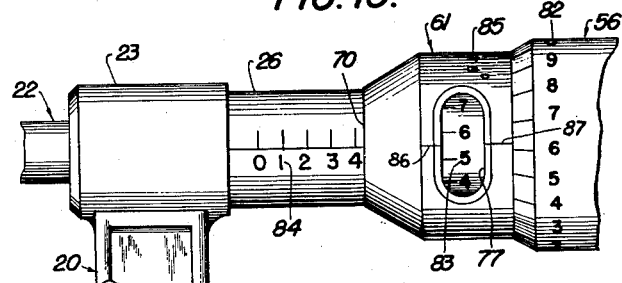
Figure 16 is an enlarged fragmentary side view of my micrometer showing still another reading thereof.
Figure 18:
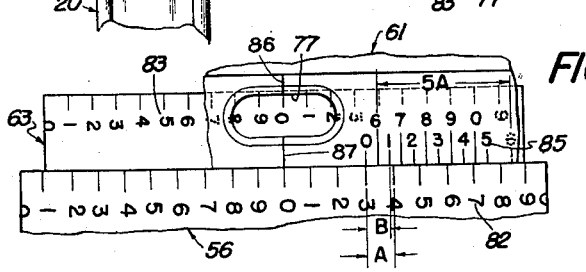
Figure 18 is a semi-schematic development of fragments of the outer, intermediate and inner scale-bearing cylinders, the scale numerals being positioned for convenient reading.

The said outer scale-bearing cylinder 56 has, on the said bevelled surface 57 thereof, a number of scale markings 82, the graduations being composed of twenty equal parts marked 0 to 9 twice around (see Figures 16, 17 and 18). Since one complete revolution of cylinder 56 corresponds to twenty thousandths of an inch longitudinal movement of the spindle, each of the twenty markings 82 represents a longitudinal movement of one thousandth of an inch.

The inner scale bearing cylinder 63 has (in a position for exposure through the window 77 of intermediate cylinder 61), a line of scale markings 83, the graduations being composed of twenty equal parts marked 0 to 9 twice around. Since the rotary movement of inner cylinder 63 is one-tenth that of outer cylinder 56, as aforesaid, one complete revolution of inner cylinder 63 would correspond to a longitudinal movement equal to ten times that produced by one revolution of cylinder 56, or twenty hundredths of an inch. Therefore, each of the twenty markings 83 on cylinder 63 represents a longitudinal movement of one hundredth of an inch.

The barrel 26 has ten longitudinally disposed scale markings 84, each representing a linear spindle movement of one-tenth of an inch.

There is also a vernier scale of markings 85 on the intermediate window cylinder 77, these being adjacent the bevelled edge 57 and cooperable with the markings 82 thereon. Since there are ten markings on scale 85 for nine on scale 82, it is obvious that the markings 85 are calibrated for ten-thousandths of an inch.

It is to be noted that since the respective outer and intermediate cylinders 56 and 61 are in fixed longitudinal relation, the vernier scales 82 and 85 are always in close juxtaposition, making reading thereof considerably easier than with conventional screw micrometers where the two coacting vernier scales are separable.

In order to reduce the total length of the vernier scale, so as to make it more compact and the reading thereof more convenient, I have devised a novel form of vernier scale, as illustrated in Figure 18. As in conventional vernier scales, each of the vernier graduations B is equal to nine-tenths the graduations A on the adjacent scale 82. But instead of extending the graduations B along one continuous scale on a single line, the scale is broken up into two parts, one above and overlapping the other. The first part or lower scale consists of B graduations from 0 to 5; and the second part or upper scale consists of B graduations 6, 7, 8, 9 and 0, the graduation "6" starting between "0" and "1" of the first part. This is the most compact arrangement, the position of graduation "6" being determined by measuring back five A graduations from where the B graduation "6" (shown dotted) would have been on an unbroken straight-line scale, the dotted graduations 6, 7, 8, 9, 0 indicating the imaginary extension of said lower scale. The "6" graduation is accordingly located between "0" and "1" on scale 85. Another way of locating said graduation "6" on said upper scale is to consider the imaginary extension of the said upper scale to the left, said extension comprising the dotted graduations 0, 1, 2, 3, 4, 5, the dotted "0" coinciding with one of the graduations "8" on scale 82. For the same reading there are thus two vernier scales constructed against scale 82, one beginning at a graduation "3" and the other at a graduation "8." Since both vernier scales give the same reading, the lower scale may be used for readings "0" to "5," and the overlapping part of the upper scale for readings "6" to "0"—the graduation "6" on the upper scale being between the graduation "0" and "1" of the lower scale. The position of said upper scale can be modified, if desired, by coinciding the dotted "0" with another selected graduation of scale 82. This compressed two-part vernier scale is cooperatively employable with the adjacent scale 82, and is readable in the manner of conventional vernier scales.

Figure 14:
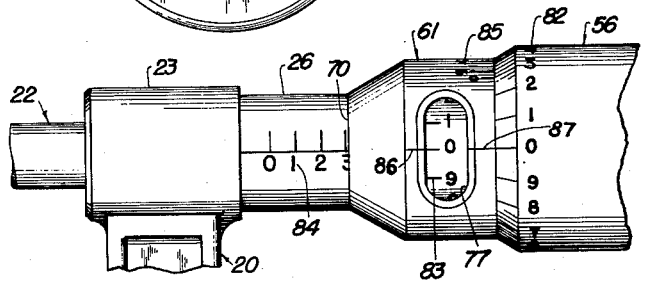
Figure 14 is an enlarged fragmentary side view of the micrometer of my invention showing one reading thereof.

Figures 14 to 17 illustrate different readings on my micrometer. In Figure 14, the reference edge 70 is directly on marking "3" of the barrel scale, the reading of the inner cylinder 63 being "0" against reference line 86, and the reading on outer cylinder 56 being also "0" against the reference line 87, said reference lines 86 and 87 being both on the intermediate cylinder 61. Hence the reading is .300, this being the distance between the anvil and forward end of the spindle.

Figure 15:
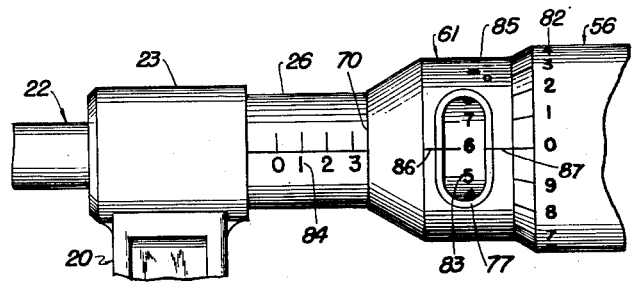
Figure 15 is an enlarged fragmentary side view of my micrometer showing another reading thereof.

In Figure 15, reference edge 70 is past "3" on the barrel, the inner cylinder reading being "6" and the outer cylinder reading being "0." The micrometer reading is hence .360″.

In Figures 16 and 17, the reference edge 70 is past "4" on the barrel, the inner scale reading being past "5," the outer scale reading past "6," and the calibration numeral "1" on scale 82 of the outer cylinder being coincident with the vernier calibration numeral "3." Hence the micrometer reading is .4563.

It is thus apparent that with the novel form of my micrometer above described, direct readings can be readily taken up to ten thousandths of an inch, without interpolation or computations, and with the same degree of accuracy as is obtainable with conventional screw micrometers. The device can be operated exactly in the manner of the conventional screw micrometer, thereby requiring no change in micrometer habits of mechanics who had become accustomed to conventional devices.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a micrometer, an anvil, a calibrated barrel, a rotatable spindle extending through said barrel in line with said anvil and having a threaded portion thereon, screw means in engagement with said threaded portion, whereby upon an operative rotation of the spindle it will move longitudinally towards or away from the anvil, a thimble secured to and movable with said spindle, an outer scale-bearing cylinder secured to and movable with said thimble, an indicating member slidably movable longitudinally over said calibrated barrel and having a forward reference edge intercepting the calibrations on the barrel, an intermediate scale-bearing member secured to said indicating member, said outer cylinder being rotatably movable relative to said intermediate member, an inner scale-bearing cylinder rotatable relative to said outer and intermediate scale-bearing members, and geared means connecting said outer and inner scale-bearing cylinders, whereby the operative rotation of the outer cylinder will cause a rotation of the inner cylinder.

2. In a micrometer, the combination according to claim 1, said geared means providing a ratio of movement between said inner and outer cylinders other than one to one.

3. In a micrometer, the combination according to claim 1, said geared means providing a ratio of movement between said inner and outer cylinders whereby the inner cylinder makes less than one revolution for each revolution of the outer cylinder.

4. In a micrometer, the combination according to claim 1, said geared means providing a ratio of movement between said inner and outer cylinders of one to ten.

5. In a micrometer of the class having a frame, an anvil, a barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale-bearing cylinder concentric with and geared to said outer cylinder and rotatable relative thereto, whereby an operative rotary movement of said spindle will cause rotational movements of said scale-bearing cylinders.

6. In a micrometer of the class having a frame, an anvil, a barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale-bearing cylinder concentric with and geared to said outer cylinder and rotatable relative thereto, an intermediate cylindrical member disposed between said inner and outer cylinders, both of said inner and outer cylinders being movable relative to said intermediate member, whereby an operative rotary movement of said spindle will cause rotational movements of said inner and outer cylinders relative to said intermediate member.

7. In a micrometer of the class having a frame, an anvil, a barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale-bearing cylinder concentric with said outer cylinder, intermeshing gears connected to said inner and outer cylinders, said gears having other than a one to one ratio, to thereby provide relative rotary movement between said two cylinders upon an operative rotation of said spindle.

8. In a micrometer of the class having a frame, an anvil, a calibrated barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale cylinder concentric with and geared to said outer cylinder and rotatable relative thereto, an indicating member slidably movable longitudinally over said calibrated barrel and having a forward reference edge intercepting the calibrations on said barrel, means to hold said indicating member against rotation on the barrel, an intermediate cylindrical member secured to said indicating member and movable longitudinally therewith, said intermediate member being disposed between said inner and outer cylinders, both of said inner and outer cylinders being movable relative to said intermediate member, whereby an operative rotary and longitudinal movement of said spindle will cause different rotational movements of said inner and outer cylinders relative to said intermediate member.

9. In a micrometer of the class having a frame, an anvil, a barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale-bearing cylinder concentric with said outer cylinder and rotatable with respect thereto, a spur gear mounted on said thimble and rotatable about an axis transverse to the axis of said barrel, said inner cylinder having thereon a set of circumferentially arranged gear teeth disposed in a plane transverse to the axis of said barrel and in engagement with the said spur gear, a non-revolvable cylinder with a second set of circumferentially arranged gear teeth in adjacent concentric relation to those of said first set and in engagement with said spur gear adjacent the region of engagement therewith of said first set of gear teeth, all of said circumferentially arranged gear teeth being substantially of the same size, whereby upon an operative rotation of said thimble and the said spur gear carried thereby, the rotatable inner cylinder will rotate relative to the barrel and the outer cylinder.

10. In a micrometer, the combination according to claim 9, and an indicating member slidably movable longitudinally over said barrel, means to hold said indicating member against rotation on the barrel, said non-revolvable cylinder extending rearwardly from said indicating member.

11. In a micrometer, the combination according to claim 9, said inner cylinder being revolvably disposed over said non-revolvable cylinder, whereby the said second set of gear teeth are disposed interiorly of said first set.

12. In a micrometer, the combination according to claim 9, and an indicating member slidably movable longitudinally over said barrel, means to hold said indicating member against rotation on the barrel, said non-revolvable cylinder extending rearwardly from said indicating member, said indicating member having abutment shoulders flanking said non-revolvable cylinder, the forward ends of said thimble and said inner cylinder being in engagement with said shoulders.

13. In a micrometer of the class having a frame, an anvil, a barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale-bearing cylinder concentric with said outer cylinder and rotatable with respect thereto, an intermediate scale-bearing cylinder disposed between said inner and outer cylinders, an indicating member slidably movable longitudinally over said barrel, means to hold said indicating member against rotation on the barrel, said indicating member having a non-revolvable cylinder extending rearwardly therefrom, said inner cylinder being revolvably disposed over said non-revolvable cylinder, a spur gear mounted on said thimble and rotatable about an axis transverse to the axis of said barrel, said inner cylinder having at the rear thereof a set of circumferentially arranged gear teeth disposed in a plane transverse to the axis of said barrel and in engagement with the said spur gear, said non-revolvable cylinder having at the rear thereof a second set of circumferentially arranged gear teeth in adjacent concentric relation to those of said first set and in engagement with said spur gear adjacent the region of engagement therewith of said first set of gear teeth, all of said circumferentially arranged gear teeth being substantially of the same size, whereby upon an operative rotation of said thimble and the said spur gear carried thereby, the rotatable inner cylinder will rotate relative to the barrel and the outer cylinder, said intermediate scale-bearing cylinder being in interlocking rotatable engagement with the forward part of said outer cylinder.

14. In a micrometer, the combination according to claim 13, said intermediate cylinder being disposed over said inner cylinder and having an apertured window through which the inner cylinder is visible.

15. In a micrometer, the combination according to claim 13, said intermediate cylinder being disposed over said inner cylinder and having an apertured window through which the inner cylinder is visible, the inner cylinder having a scale thereon adapted for registry with said window, said intermediate cylinder having a reference line adjacent said window.

16. In a micrometer, the combination according to claim 13, said intermediate cylinder having a scale thereon adjacent the foremost portion of the said outer cylinder, said outer cylinder having a scale at its foremost end coacting with said scale on the intermediate member, said outer and intermediate cylinders being held against relating longitudinal movement.

17. In a micrometer, the combination according to claim 9, further provided with a substantially cylindrical locking ring disposed within said outer cylinder and in releasable friction engagement with the inner surface thereof, the forward part of said ring having a lip overlying said spur gear.

18. In a micrometer, the combination according to claim 9, said thimble having a flat outer surface upon which said spur gear is in resting engagement, and a substantially cylindrical locking ring disposed within said outer cylinder and in releasable frictional engagement with the inner surface thereof, the forward part of said ring having a lip overlying said spur gear, the inner side of said lip being flat and substantially parallel to said flat outer surface of the thimble, the outer side of said lip being arcuate and in engagement with the inner surface of said outer cylinder.

19. In a micrometer, the combination according to claim 9, the height of the teeth of said spur gear measured in a transverse direction normal to the longitudinal axis of the barrel being no less than the combined thickness of adjacent teeth on said two sets of said circumferentially arranged gears, measured in the same direction.

20. In a micrometer of the class having a frame, an anvil, a barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale-bearing cylinder concentric with and geared to said outer cylinder and rotatable relative thereto, an intermediate cylindrical member disposed between said inner and outer cylinders, both of said inner and outer cylinders being movable relative to said intermediate member, whereby an operative rotary movement of said spindle will cause rotational movements of said inner and outer cylinders relative to said intermediate member, and a vernier arrangement consisting of two coacting calibrated scales, one of said scales being on the said intermediate cylinder and the other on said outer cylinder, there being along a predetermined circumferential length of said outer cylinder nine equal divisions, and on the said intermediate cylinder ten equal divisions divided into two overlapping rows, the distance between divisions in said two rows being equal to nine-tenths that between the said divisions of the outer cylinder, the first division of one of said two rows being disposed between two adjacent divisions on the other of said two rows.

21. In a micrometer of the class having a frame, an anvil, a barrel, a rotatable threaded spindle extending through the barrel and movable longitudinally toward and away from the anvil, the combination of a thimble secured to and movable with said spindle, an outer scale-bearing cylinder secured to and movable with said thimble, an inner scale-bearing cylinder concentric with and geared to said outer cylinder and rotatable relative thereto, an intermediate cylindrical member disposed between said inner and outer cylinders, both of said inner and outer cylinders being movable relative to said intermediate member, whereby an operative rotary movement of said spindle will cause rotational movements of said inner and outer cylinders relative to said intermediate member, and a vernier arrangement consisting of two coacting calibrated scales, one of said scales being on the said intermediate cylinder and the other on said outer cylinder, there being along a predetermined circumferential length of said outer cylinder nine equal divisions, and on the said intermediate cylinder ten equal divisions divided into two overlapping rows, the distance between divisions in the said two rows being equal to nine-tenths that between the said divisions on the outer cylinder, one of said two rows having divisions numbered from "0" to "5", and the other row having divisions numbered from "6" on, the division "6" being disposed between divisions "0" and "1".

References Cited in the file of this patent

Advertisement, Frequency Standards Corp., October 27, 1949.

Catalogue, Keuffel and Esser Co., 38th edition, February 1936, Div. 66, page 319.